Oct. 4, 1960　　B. T. HENSGEN ET AL　　2,954,811
APPARATUS FOR PREPARING EQUAL WEIGHT SLICES OF PRODUCT
Filed April 4, 1957　　3 Sheets-Sheet 1

BERNARD T. HENSGEN
LOUIS CHANDLER
EDWARD C. VANDENBURGH
　　　　INVENTORS

BY R. G. Story

ATTORNEY

BERNARD T. HENSGEN
LOUIS CHANDLER
EDWARD C. VANDENBURGH
INVENTORS

BY R. G. Story

ATTORNEY

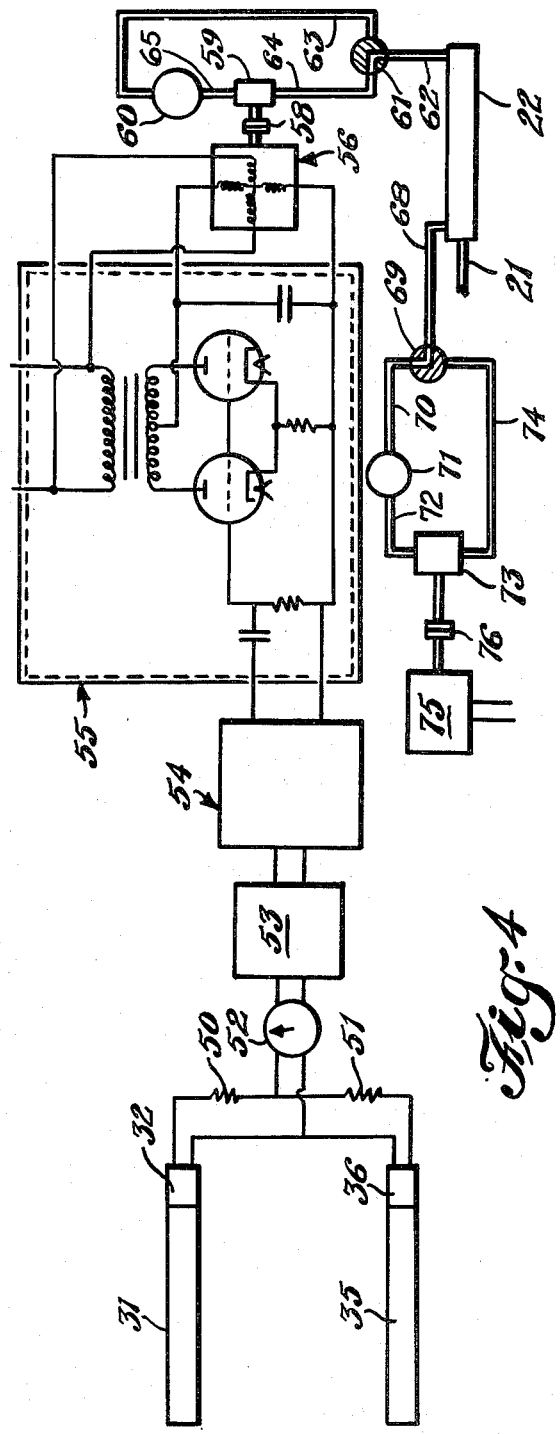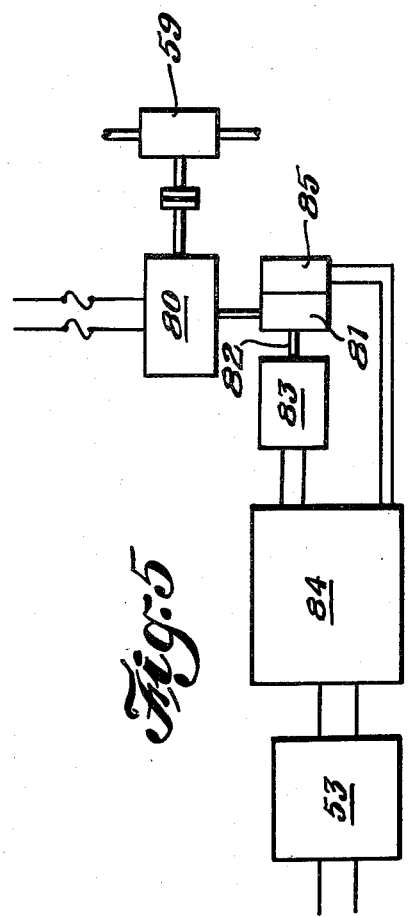

United States Patent Office 2,954,811
Patented Oct. 4, 1960

2,954,811

APPARATUS FOR PREPARING EQUAL WEIGHT SLICES OF PRODUCT

Bernard T. Hensgen, Louis Chandler, and Edward C. Vandenburgh, Chicago, Ill., assignors to Swift & Company, Chicago, Ill., a corporation of Illinois Filed Apr. 4, 1957, Ser. No. 650,688

3 Claims. (Cl. 146—95)

The present invention relates to an apparatus for cutting slices of food products, such as meat or cheese, of constant weight.

The impetus in the merchandizing of food products is more and more towards the pre-packaging of product. This procedure has become desirable not only from the standpoint of giving the buyer a greater freedom of selection, but also from the standpoint of eliminating personnel in sales capacities. The elimination of hand labor is advantageous where it can be replaced by machine operations at some central location where all of the packaging is done. In such packaging operations it is usually preferable that the packages of product are all of a given weight. The other possibility is to have what is termed the "catch weight" system wherein units of product of substantially the same size are packaged with the units being weighed after packaging and the price per unit of weight being placed thereon. However, it greatly simplifies all operations if a constant unit of weight is employed for each package.

The producing of packages of product of a constant weight often becomes complicated. For example, the cross-sectional area of the product may change whereby the thickness must be adjusted in order to obtain an equal volume of product. Another problem may be that the block from which the slices are being cut is composed of components of varying density with the percentage of the components present changing in various portions of the block. For example, in a slab of bacon the amount of fat and lean present varies in various portions of the slab and the density of the fat is different from that of the lean. In such a case the difference in density or weight of the components must be taken into consideration in arriving at the size of the slice that should be cut to obtain slices of equal weight. In a slice of bacon both the physical dimensions and the density must be taken into consideration. Other products, such as for example Swiss cheese, have large voids in the interior of the block. The size of these voids must be taken into consideration in arriving at slices of constant weight or substantially constant weight.

The principal object of the present invention is to provide a method and apparatus that will produce slices of constant or substantially constant weight even under the handicaps imposed by the problems of the preceding paragraph.

Further objects and advantages will be apparent from the following description taken in conjunction with the drawings, in which:

Figure 4 is a diagrammatic illustration of the control mechanism of the illustrated embodiment; and Figure 5 is an alternative apparatus for a portion of the feed control.

The method we have devised is to pass a beam of radiant energy through portions of the block of product to be cut into slices. (By slices we intend to include generally all types and thicknesses of pieces cut from a larger unit of product.) We then measure the amount of that radiant energy that actually passes through the portions of the block of product. The measured amounts of energy will represent the amount of product interposed between the original beam and the area in which the measurement is being made. Using this information we cut slices of a size such that the amount of product in the slice is of the desired amount. Preferably in carrying out this process we use only a portion of the beam of radiant energy to pass through the block to be cut and we use a second portion of that beam to pass through a standard absorber. The amount of radiant energy received at the oposite side of the block is then compared with the amount of radiant energy that passes through the standard absorber. This procedure will correct for variations in the strength of the beam of radiant energy.

While various types of penetrating radiant energy might be employed, such as for example beta rays, we prefer to use gamma rays. The embodiment hereinafter described is concerned with the production of slices of bacon of equal weight. For this purpose we have found that gamma rays of between 0.2 mev. and 2.0 mev. are preferable. In such an application to facilitate measuring the width of the block we shield the width of the beam to correspond to the width of the slab of bacon. By "correspond to" we do not mean to imply that it must be equal to, but the width of the beam must vary in a predetermined relationship to the width of the slab.

The preference for gamma rays is primarily based upon their penetrating power. In order to obtain the equivalent penetration with most other types of radiant energy the equipment cost becomes very substantial since natural emitters of other types of radiation will not be sufficiently strong except for very thin product. Furthermore, at the energy levels necessary for penetrating the product, gamma rays will not produce any side effects such as color or flavor changes in the product. We prefer to use a natural source of irradiation as compared to generating equipment because of its size and stability of operation.

Figure 1:
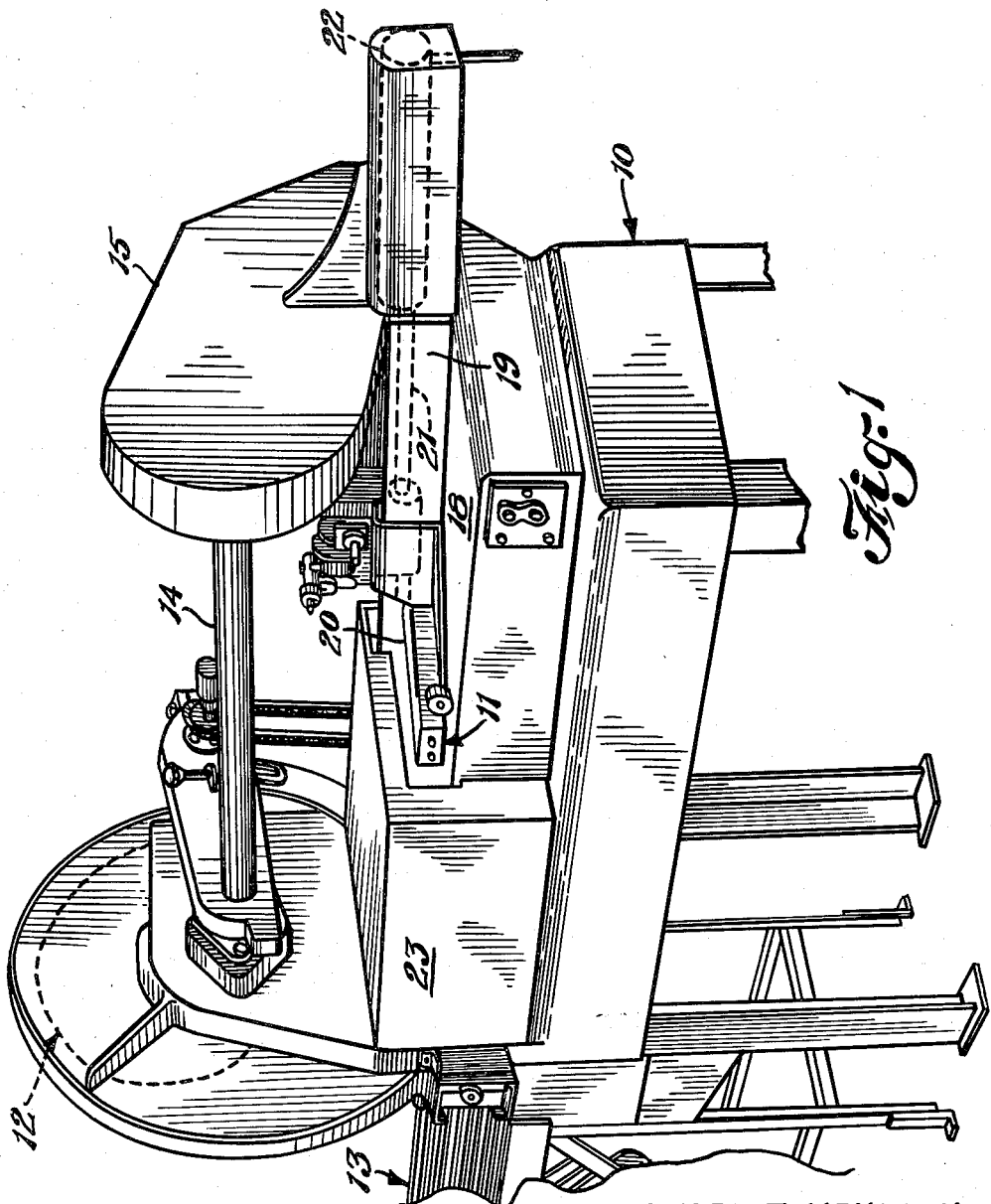
Figure 1 is a perspective view of a slicing machine embodying the present invention.

Referring to Figure 1, there is illustrated a form of bacon slicer which is representative of the type of machines employed. The slicer comprises a frame generally 10. A conveyor generally 11 moves the slabs of bacon to a rotary knife generally 12 which cuts slices and deposits them on a discharge conveyor generally 13 to be taken to suitable packaging machinery. While it is not possible to see the structure in Figure 1, the discharge conveyor 13 will incorporate suitable apparatus for separating the slices into groups of a given number. Such apparatus is illustrated in U.S. Patent No. 2,898,722, to B. T. Hensgen et al.

In the conventional manner knife 12 is mounted on a shaft 14 suitably journaled in bearings on frame 10. A power means enclosed within housing 15 connects to shaft 14 to rotate the shaft and the knife 12.

Conveyor 11 comprises a supporting surface 18 for the slab of bacon. A side wall 19 is employed as both a guide for one side of the slab and as a guide for a pusher 20 which is employed to move the slab to knife 12. At the back of wall 19 pusher 20 connects to a piston rod 21 of a hydraulic cylinder 22. The apparatus for measuring the size and density of the slab is mounted within a housing 23 which serves as a radiation shield through which the slab of bacon is pushed.

Figure 3:
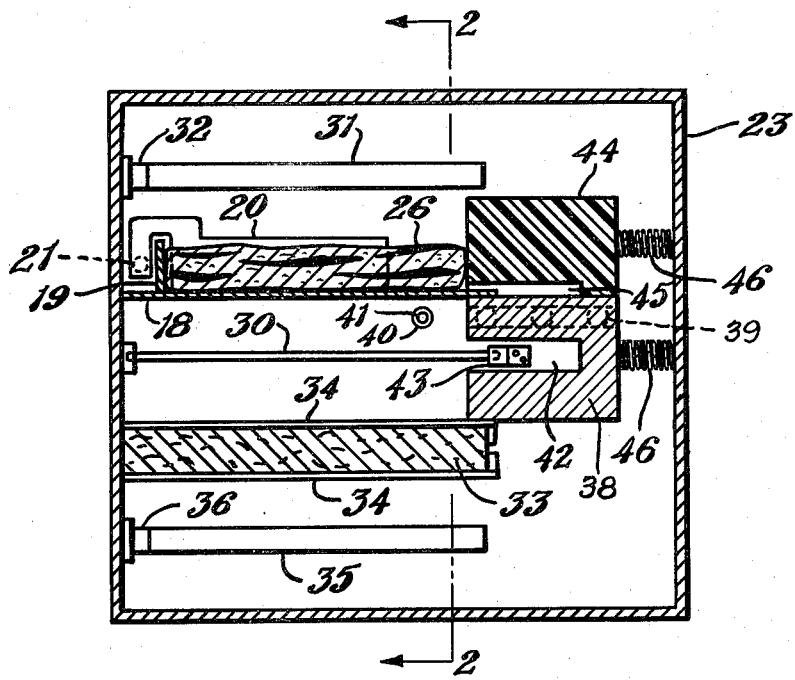
Figure 3 is a section taken at line 3—3 of Figure 2.
Figure 2:
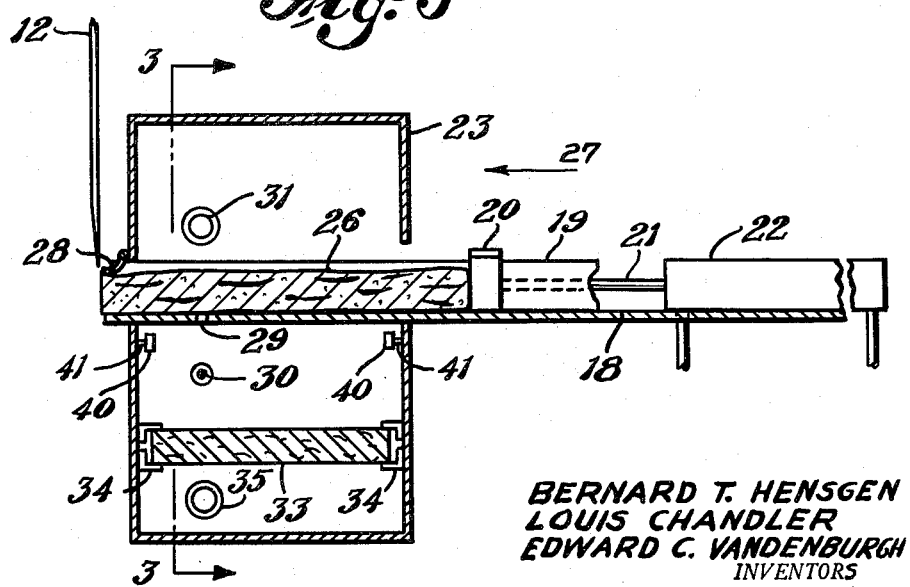
Figure 2 is a sectional side view of a portion of the embodiment of Figure 1.

Referring particularly to Figures 2 and 3, the slab of bacon 26 is moved towards knife 12 in the direction indicated by arrow 27. Immediately to the rear of knife 12 with respect to the direction of movement are some hold-down fingers 28. Farther to the rear of the hold-down fingers is the area in which the measurement of the size and density of the slab is made. This area is represented by the opening 29 through conveying platform 18 through which opening pass gamma rays from a suitable source thereof. In the illustrated embodiment this source is a pencil-shaped stick 30 of Cesium$_{137}$. Thus the portion of the slab 26 of which the measurements are made will be the portion immediately above the opening 29. Aligned with gamma ray emitter 30 and opening 29 is a scintillation crystal 31 and photomultiplier 32. Scintillation crystals suitable for the purpose are made by Harshaw Chemical Co., Cleveland, Ohio. Many of the plastic phosphors would also be suitable for this purpose. Radio Corporation of America produces a photomultiplier tube under the number 1P21 that would be suitable for this usage. This combination will measure the amount of gamma ray which passes through the portion of slab 26 immediately over opening 29 and will produce a current that is a function of the amount of gamma rays received.

At the opposite side of emitter 30 and positioned to intercept another portion of the beams of gamma rays from that emitter is a standard absorber 33 supported by brackets 34. The specific size and density of the absorber 33 is unimportant but preferably the absorber is of a thickness and density that the amount of gamma rays that will pass therethrough will be substantially equal to the amount of gamma rays that will pass through the average thickness of an average portion of a slab of bacon. Below absorber 33 is another scintillation crystal 35 and photomultiplier 36 to measure the amount of gamma rays that pass through the standard absorber. To measure the width of the slab 26 a shield is employed to cut off the beam from the emitter 30 to crystals 31 and 35, at a point corresponding to one side of the slab. The position of the opposite side of the slab is fixed by fence 19. In the illustrated embodiment this shield takes the form of a block 38 of absorbent material such as lead. The block 38 has a slot 39 in the opposite sides thereof, which slot forms a track for a plurality of rollers 40 attached to the walls of shield 23 by their shafts 41. A slot 42 in block 38 fits about emitter 30 and about a cross bracket 43 used to support the end of emitter 30. Above shield 38 is a feeler member 44 to contact the side of slab 26 and position the shield to correspond to the side of the slab. Feeler member 44 is attached to the block and has a slot 45 therein to fit about supporting platform 18. Springs 46 urge the feeler member 44 against the side of slab 26. Thus, as the width of the slab 26 changes, the position of shield 38 will change so that at all times the portions of the beam of gamma rays directed toward scintillation crystals 31 and 35 will correspond to the width of the slab as measured from fence 19.

The photomultiplier tubes 32 and 36 will produce a direct current upon gamma rays striking the scintillation crystals. The amount of this direct current will be a function of the gamma ray energy striking the scintillation crystals 31 and 35. The current from the two photomultiplier tubes is fed in opposed polarity through a pair of resistors 50 and 51 to a meter 52. The resistors 50 and 51 are used to convert the current flow into a voltage drop so that a voltage may be measured which is proportional to the current flow through the resistors. The meter 52 then indicates the difference between the IR drop through resistor 50 with respect to the IR drop through the resistor 51 and thus will indicate the difference between the gamma ray energy being received by the scintillation crystal 31 as compared to the gamma ray energy being received by the scintillation crystal 35. This voltage is then fed to a direct current chopper or converter 53 where it is converted to an alternating current which will be proportional to the initial D.C. voltage. The alternating current from chopper 53 is then fed to a conventional voltage amplifier 54 which feeds power amplifier generally 55 to operate a motor 56 at a speed which is a function of the input voltage from chopper 53. Such choppers or modulators and amplifiers are well-known units of equipment. For example, such units are manufactured by the Brown Instruments Division of Minneapolis-Honeywell Regulator Company, Philadelphia, Pa.

Motor 56 is connected by a coupling 58 to the shaft of a gear pump 59, although obviously other types of positive pumps might be employed. The hydraulic system of pump 59 is a part comprising a reservoir 60 and a two position valve 61. Valve 61 is connected so that the hydraulic line 62 from the rear of hydraulic cylinder 22 may be connected either to a pipe 63 leading to reservoir 60 or to a pipe 64 from pump 59. A pipe 65 connects the intake of pump 59 with reservoir 60.

The opposite end of hydraulic cylinder 22 is connected by a hydraulic line 68 to a two position valve 69. A pipe 70 leads from valve 69 to a reservoir 71. A pipe 72 connects reservoir 71 with a pump 73. Valve 69 and pump 73 are connected by a pipe 74. Pump 73 is driven by a motor 75 through a coupling 76.

In moving a slab 26 toward knife 12 the positions of valves 61 and 69 are as shown in Figure 4. Thus the forward end of hydraulic cylinder 22 (the end nearest the pusher 20) is discharging into reservoir 71, with the output of pump 73 being blocked (normally the operator would shut off motor 75 at this time). Valve 61 is positioned so that the rearward end of the hydraulic cylinder 22 is connected to pump 59. The amount of oil being pumped by pump 59 is a function of the speed of the pump and of the motor 56. Thus, the speed of movement of pusher 20 will be a function of the speed of rotation of motor 56. Amplifier 54 controls the speed of rotation of motor 56 as a function of the amount of gamma ray energy being received by the scintillation crystal 31, i.e. the gamma ray energy passing through the slab 26, as compared to the gamma ray energy being received by the scintillation crystal 35, i.e. the gamma ray energy passing through the standard absorber 33. Amplifier 54 is set so that motor 56 will rotate at a rate such that the thickness of the slice cut by knife 12 will produce a slice that is of a constant weight, since the gamma ray energy passing through the slab is a function of the size of the portion of the slab through which the gamma ray energy is passing and the density of the product within that portion. The motor 56 and the hydraulic system connected to motor 56 introduce a time delay sufficient so that the change in speed of the movement of the slab does not take place until the portion of the slab through which the measurements have been made reach the point at which knife 12 is ready to cut a slice. A variable time delay circuit such as those well-known in the art is incorporated in amplifier 54 so as to enable the operator to set the time delay properly. The time delay preferably is one which will vary with the output signal (i.e. the faster the slab is ordered to move the shorter will be the delay for subsequent signals within the delay time) so that the slab will be moving at the proper speed for a slice to be cut when the portion from which the slice is to be cut arrives at the knife.

To move pusher 20 rearwardly for the insertion of a new slab 26, motor 56 is de-energized and motor 75 is energized with valves 61 and 69 being repositioned so that the rearward end of cylinder 22 is connected by pipes 68 and 74 to pump 73 which then provides the hydraulic pressure to move the piston and piston rod 21 in the rearwardly direction.

The foregoing description is for the purpose of complying with 35 U.S.C. 112, and should not be construed as imposing unnecessary limitations on the appended claims, inasmuch as numerous modifications within the purview of the appended claims will be apparent to those skilled in the art. For example, in the embodiment described, the speed of rotation of knife 12 is maintained constant while the thickness of the slab is controlled by the speed at which the slab is moved to the knife. In some applications the two could be reversed with the slab moving at a constant rate of speed while the knife rotated at a variable rate of speed to produce slabs of varying thicknesses. In such an embodiment the structure would be substantially the same as that described except that motor 56 would be connected to control the speed of rotation of the knife 12. In other embodiments the slab could be held in a fixed position with the cutting means moving linearly with respect to the slab and the amount of movement being controlled as a function of the gamma ray energy.

In place of the Cesium$_{137}$ source which has an emission energy of 0.661 mev., other irradiation sources such as Cobalt$_{60}$ or Zinc$_{65}$, the gamma rays from which are approximately 1.1 mev., with a relatively good half-life could be used. Bremstrahling radiation would be another suitable possibility. The source used should be readily available, have a good half-life and preferably have an emission strength of between about 0.2 mev. and 2.0 mev.

Figure 5 illustrates an alternative motor control apparatus for driving pump 59. In this instance pump 59 is driven by a motor 80 having a speed control rheostat 81 connected thereto. The shaft 82 of rheostat 81 is connected to a positioning servo motor 83 operated by a servo amplifier 84. A feed back control rheostat 85 is ganged with rheostat 81 and is connected to amplifier 84. Various types of servo motors 83, amplifiers 84 and feed back controls (rheostat 85) might be employed. A suitable embodiment of these elements is illustrated and described in Handbook of Industrial Electronic Circuits, by John Markus and Vin Zeluff, published by McGraw-Hill Book Company in 1948, at page 143. Amplifier 84 is connected to chopper 53.

We claim:

1. A cutting machine comprising cutting means, an object conveyor, power means associated with said conveyor to move objects along a path having four sides on said conveyor to said cutting means, means positioned at one side of said conveyor to direct at said objects a part of a beam of radiant energy of a strength such that a portion of said energy will pass through said objects, radiant energy sensing means positioned at a second side of said conveyor opposite said path from said one side to receive and to measure said portion of said energy, a standard absorber positioned to intercept another part of said beam, said absorber permitting a portion of said second part to pass through said absorber, sensing means positioned to measure said portion of said second part, means associated with said conveyor and at a third side of said path to align a side of said object with respect to said conveyor, means at the fourth side of said path to limit the width of said parts of said beam corresponding to the width of said object from said one side of said object to the opposite side thereof at the line of intersection of the one part of said beam with said object, and control means connected to said sensing means to compare the strengths of said portions and connected to said power means to move said objects along said conveyor as a function of the comparative strengths of said portions.

2. A cutting machine comprising cutting means, an object conveyor, power means associated with said conveyor to move objects along a path having four sides on said conveyor to said cutting means, a radiation emitter positioned beneath said conveyor to direct at said objects a part of a beam of radiant energy of a strength such that a portion of said energy will pass through said objects, radiant energy sensing means positioned above said conveyor opposite said emitter to receive and to measure said portion of said energy, a standard absorber positioned to intercept a second part of said beam, said absorber permitting a portion of said second part to pass through said absorber, sensing means positioned to measure said portion of said second part, means associated with said conveyor at a third side of said path to align a side of said object with respect to said conveyor, a movable radiation shield enveloping an end of said radiation emitter generally opposite said last-mentioned means, said shield being resiliently mounted for reciprocation transversely of said conveyor to correspond with a side of said object opposite said aligned side whereby said parts of said radiation beam are limited to extend only the width of said object between said guide and said shield, and control means connected to said sensing means to compare the strength of said portion and connect it to said power means to move said objects along said conveyor as a function of the comparative strengths of said portions.

3. A cutting machine comprising cutting means, an object conveyor, power means associated with said conveyor to move objects along a path to said cutting means, a radiation emitter positioned beneath said conveyor to direct at said objects a part of a beam of radiant energy of a strength such that a portion of said energy will pass through said objects, a scintillation crystal and photo multiplier positioned above said conveyor opposite said path from said radiation emitter to receive and measure said portion of said energy, a standard absorber positioned below said radiation emitter to intercept another part of said beam, said absorber permitting a portion of said second part to pass through said absorber, a second scintillation crystal and photo multiplier positioned beyond said standard absorber from said radiation emitter to measure said portion of said second part, a guide adjacent one side of said conveyor to align a side of said object with respect to said conveyor, a movable radiation shield enveloping an end of said radiation emitter generally opposite said guide, said shield being spring loaded to be reciprocable transversely of said conveyor and held in abutment with a side of said object opposite said aligned side whereby said parts of said radiation beam are limited to extend only the width of said object between said guide and said shield, and control means connected to said photo multipliers to compare the strength of said portions and connected to said power means to move said objects along said conveyor as a function of the comparative strengths of said portions.

References Cited in the file of this patent

UNITED STATES PATENTS

| 2,264,725 | Shoupp et al. | Dec. 2, 1941 |
| 2,763,789 | Ohmart | Sept. 18, 1956 |
| 2,768,666 | Garapolo et al. | Oct. 30, 1956 |

FOREIGN PATENTS

| 861,665 | Germany | Jan. 5, 1953 |